May 7, 1946.  E. E. KEARNS  2,399,929

VEHICLE

Filed Sept. 26, 1944

Inventor:
Earl E. Kearns,
by Harry E. Dunham
His Attorney.

Patented May 7, 1946

2,399,929

UNITED STATES PATENT OFFICE 2,399,929

VEHICLE

Earl E. Kearns, Erie, Pa., assignor to General Electric Company, a corporation of New York Application September 26, 1944, Serial No. 555,822

8 Claims. (Cl. 180—22)

My invention pertains to a vehicle, and more particularly to a large vehicle of the type adapted to carry a large number of passengers and formed as two interconnected parts.

An object of my invention is to provide an improved vehicle.

Another object of my invention is to provide an improved passenger vehicle formed of two interconnected sections having an axle at each end for supporting a part of the weight of the vehicle and a third driving axle intermediate the ends of the vehicle for driving the vehicle.

A further object of my invention is to provide an improved passenger vehicle formed of two interconnected sections having a supporting axle at each end thereof and an intermediate driving axle mounted on a truck which is adapted to provide for transmitting a larger part of the weight of the vehicle to the driving axle for minimizing skidding and slipping of the driving wheels of this driving axle.

Figure 1:
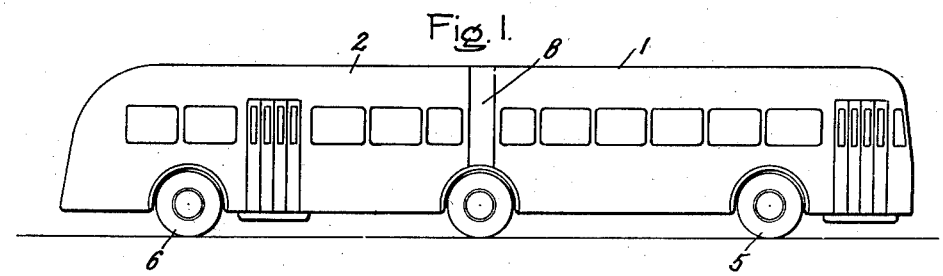
Figure 2:
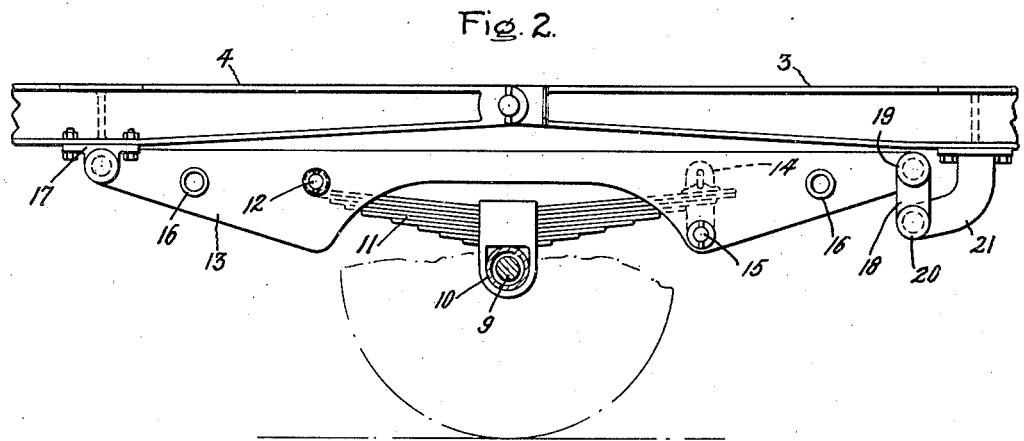
Figure 3:
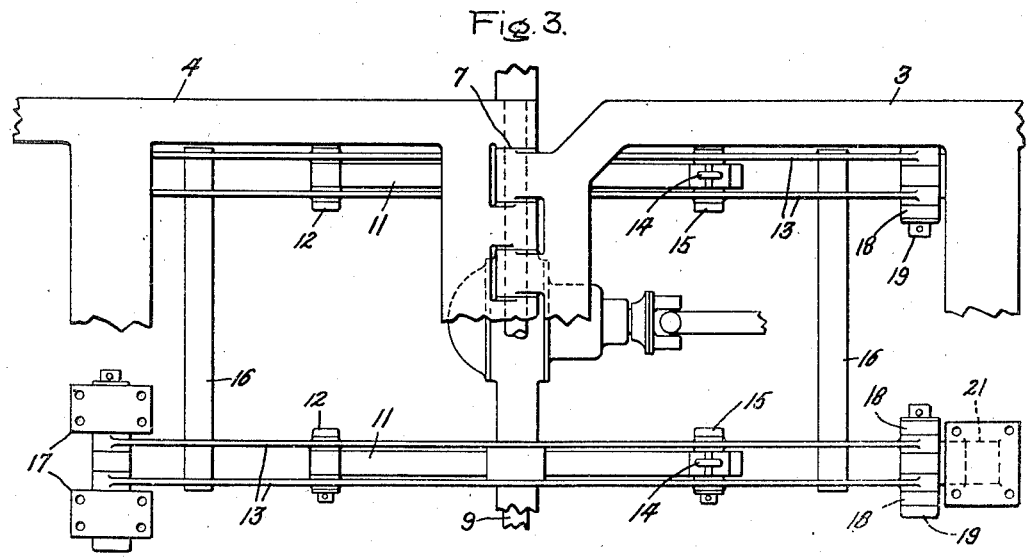

In the drawing, Fig. 1 is a side elevational view of the passenger vehicle provided with an embodiment of my invention; Fig. 2 is a side elevational view showing the connection of the two parts of the chassis frame and the supporting truck and driving axle construction of the vehicle shown in Fig. 1; and Fig. 3 is a plan view, partly broken away, of the truck and chassis construction shown in Fig. 2.

Referring to the drawing, I have shown my invention in connection with a passenger vehicle of the multisection type formed as a large size motor coach which may be either self-propelled or a trolley coach formed of two main body sections 1 and 2 which are mounted respectively on two main chassis sections 3 and 4. In the illustrated construction, both ends of the vehicle are supported on axles mounted on rubber-tired wheels 5 and 6 which may be of the dirigible type and which are adapted to be steered in synchronism, such that when the front wheels 5 are turned in one direction, the rear wheels 6 are turned in the opposite direction, thus providing for the negotiation of relatively sharp turns and turns on relatively narrow streets by pivoting the relatively large vehicle about the center thereof. The two body sections 1 and 2 of the vehicle are connected together by a transverse hinge articulation joint 7 which provides for relative vertical pivotal movement of one body section to the other but holds the two body and chassis sections rigid laterally. This provides for the necessary limited amount of relative vertical movement of the vehicle in traversing irregularities in the pavement of a street and provides the necessary flexibility for negotiating changes in the grade of the supporting pavement or roadway. A suitable interconnecting flexible body section 8 is arranged between the two parts 1 and 2 to provide an enclosure which allows for the relative movement between the two parts of the vehicle. A third axle 9 is arranged intermediate the ends of the vehicle adjacent the interconnection of the two sections of the body and chassis and is adapted to be driven by any suitable source of power, such as an electric motor, and suitable gearing arranged in a differential gear housing. In vehicles of this type, it has been found that when a double axle is used as the central support for the vehicle or when a single drive axle is arranged intermediate the ends of the vehicle, skidding is apt to occur on slippery surfaces as the proportion of the weight of the vehicle on the central driving axle or axles is too small compared to the proportion of the weight of the vehicle carried by the two end axles. This is a definite disadvantage which may be overcome by a feature of my improved construction in which the proportion of the weight on the central drive axle is considerably increased over the weight carried by the end axles. As shown in detail in Figs. 2 and 3, the central drive axle 9 is mounted in suitable bearings 10 which support a longitudinally extending framework, which may be formed of separable frames or by a rigid truck supported through a suitable spring suspension such as leaf springs 11 suitably secured as by a rotatably movable pin 12 at one end thereof to side frames 13 of the truck and arranged to support the other end of the truck through swing links 14 which engage the other end of the springs 11 and are pivotally connected at 15 to the truck side frames 13. The truck side frame members 13 may be connected adjacent the ends thereof by end frames 16 which are suitably welded or otherwise secured to the side frame members 13 to form a transversely and longitudinally rigid truck structure, or the side frames may not be connected transversely rigid as suitable strength may be built into body section framing. One end of the truck or frames is connected by pivotal hinge members 17 secured to the rear chassis frame section 4 for pivotal movement of the truck in a vertical direction relative to the vehicle chassis and body and providing a restraint against relative transverse swiveling of the truck and vehicle chassis as can be seen from the details shown in Fig. 3. The other end of the truck or frames is connected to the forward chassis section 3 by a vertically and longitudinally movable pivotal connection which also provides restraint against relative transverse swiveling of the truck and the vehicle chassis. This connection is formed by swing links 18 which are pivotally connected at 19 to the truck side frames 13 and pivotally connected at 20 to a rigid supporting arm 21, which is secured to the forward chassis frame section 3 to provide for limited vertical and longitudinal movement of the truck relative to the chassis and body of the vehicle. The length of the truck and the points of the support of the ends of the truck to the chassis sections 3 and 4 are made such that substantially more than a third and preferably more than half the weight of the vehicle is supported on the truck. In the arrangement disclosed, this may be 60 per cent or more of the total weight of the vehicle and its contents, such that a considerably greater portion of the weight of the vehicle is available for loading the driving axle 9 to increase its traction and provide a more practical vehicle for operation on slippery roadways and heavy grades. While the details of the truck construction and its connection to the vehicle chassis illustrate a practical construction, it is obvious that both ends of the frame and both ends of the spring suspension of the driving axle might be made the same or these connections might be varied from the basic connections illustrated in the drawing.

While I have illustrated and described a particular embodiment of my invention, modifications thereof will occur to those skilled in the art. I desire it to be understood, therefore, that my invention is not to be limited to the particular arrangement disclosed, and I intend in the appended claims to cover all modifications which do not depart from the spirit and scope of my invention.

What I claim as new and desire to secure by Letters Patent of the United States is:

1. A vehicle having a plurality of main chassis sections, means for interconnecting said chassis sections for relative vertical pivotal movement, means adjacent each end of said vehicle for supporting said vehicle, a longitudinally extending framework, means pivotally connecting said longitudinally extending framework to said chassis sections for relative vertical pivotal movement therebetween at such points longitudinally of said vehicle that substantially more than a third of the weight of said vehicle is supported on said framework and for restraining transverse swiveling of said longitudinally extending framework relative to said chassis, a driving axle, and means for mounting said framework on said driving axle for transmitting the weight on said framework to said driving axle.

2. A vehicle having a pair of main body and chassis sections, means interconnecting said chassis sections for relative vertical pivotal movement, means including an axle and wheels adjacent each end of said vehicle for supporting said vehicle, a longitudinally extending truck means pivotally connecting said longitudinally extending truck to said chassis sections for relative vertical pivotal movement therebetween at such points that substantially more than a third of the weight of said vehicle is supported on said truck and for restraining transverse swiveling of said truck relative to said chassis, a driving axle with driving wheels, and means for resiliently mounting said truck on said driving axle for transmitting the weight on said truck to said driving axle.

3. A vehicle having a plurality of main chassis sections, means for interconnecting said chassis sections for relative vertical pivotal movement, means adjacent each end of said vehicle for supporting said vehicle, a longitudinally extending framework, means pivotally connecting said longitudinally extending framework to said chassis sections for relative vertical pivotal movement therebetween and having such a length and connected to said chassis sections at such points longitudinally of said vehicle that substantially more than half the weight of said vehicle is supported on said framework and for restraining transverse swiveling of said longitudinally extending framework relative to said chassis, a driving axle, and means for resiliently mounting said framework on said driving axle for transmitting the weight on said framework to said driving axle.

4. A vehicle having a pair of main body and chassis sections, means including a pivotal hinge joint interconnecting said chassis sections for relative vertical pivotal movement, means including an axle and wheels adjacent each end of said vehicle for supporting and steering said vehicle, a longitudinally extending truck, means pivotally connecting said longitudinally extending truck to said chassis sections for relative vertical pivotal movement therebetween and for restraining transverse swiveling of said truck relative to said chassis section, a driving axle with driving wheels, and means including a leaf spring suspension for resiliently mounting said truck for relative vertical movement and for slight relative longitudinal movement on said driving axle for transmitting the weight on said truck to said driving axle.

5. A vehicle having a pair of main body and chassis sections, means including a pivotal hinge joint interconnecting said chassis sections for relative vertical pivotal movement, means including an axle and wheels adjacent each end of said vehicle for supporting said vehicle, a longitudinally extending framework, means pivotally connecting said longitudinally extending framework to said chassis sections for relative vertical pivotal movement therebetween and at such points that substantially more than a third of the weight of said vehicle is supported on said framework and for restraining transverse swiveling of said longitudinally extending framework relative to said chassis section, a driving axle with driving wheels, and means including a spring suspension for resiliently mounting said framework on said driving axle for transmitting the weight on said framework to said driving axle.

6. A vehicle having a pair of main chassis sections, means for interconnecting said chassis sections for relative vertical pivotal movement, means adjacent each end of said vehicle for supporting said vehicle, a longitudinally extending truck means pivotally connecting said longitudinally extending truck to one of said chassis sections for relative vertical pivotal movement therebetween and means for vertically and longitudinally movably connecting said truck by a pivotal joint to the other of said chassis sections for limited vertical and longitudinal movement relative thereto and for restraining transverse swiveling of said truck relative to said chassis section, said truck having such a length and said truck connections to said chassis sections being arranged longitudinally of said vehicle such that substantially more than half the weight of said vehicle is supported on said truck, a driving axle, and means mounting said truck on said driving axle for transmitting the weight on said truck to said driving axle.

7. A vehicle having a pair of main chassis sections, means for interconnecting said chassis sections for relative vertical pivotal movement, means adjacent each end of said vehicle for supporting said vehicle, a longitudinally extending framework, means pivotally connecting said longitudinally extending framework to one of said chassis sections for relative vertical pivotal movement therebetween and means for vertically and longitudinally movably connecting said framework by a pivotal joint to the other of said chassis sections and for restraining transverse swiveling of said longitudinally extending framework relative to said chassis section, said framework having such a length and said framework connections to said chassis sections being arranged longitudinally of said vehicle such that substantially more than half the weight of said vehicle is supported on said framework, a driving axle, and means including a spring suspension for resiliently mounting said framework for relative vertical movement and for slight relative longitudinal movement on said driving axle for transmitting the weight on said framework to said driving axle.

8. A vehicle having a pair of main body and chassis sections, a pivotal joint interconnecting said chassis sections, dirigible wheels at each end of said vehicle for supporting and steering said vehicle, a longitudinally extending truck, means pivotally connecting said longitudinally extending truck to one of said chassis sections for relative vertical pivotal movement therebetween and means for vertically and longitudinally movably connecting said truck by a pivotal joint to the other of said chassis sections for limited vertical and longitudinal movement relative thereto and for restraining transverse swiveling of said truck relative to said chassis section, said truck having such a length and said truck connections to said chassis sections being arranged longitudinally of said vehicle such that substantially more than half the weight of said vehicle is supported on said truck, a driving axle, and means including a leaf spring suspension for resiliently mounting said truck for relative vertical movement and for slight relative longitudinal movement on said driving axle for transmitting the weight on said truck to said driving axle.

EARL E. KEARNS.